United States Patent
Ogawara

(10) Patent No.: US 9,728,227 B2
(45) Date of Patent: Aug. 8, 2017

(54) DISPLAY SYSTEM, INFORMATION TERMINAL, DISPLAY DEVICE, AND RECORDING MEDIUM

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 107 days.

(21) Appl. No.: 14/338,983

(22) Filed: Jul. 23, 2014

(65) Prior Publication Data
US 2015/0030309 A1    Jan. 29, 2015

(30) Foreign Application Priority Data

Jul. 24, 2013   (JP) ................................ 2013-153230

(51) Int. Cl.
G11B 27/10    (2006.01)
G11B 27/34    (2006.01)
(Continued)

(52) U.S. Cl.
CPC .......... *G11B 27/102* (2013.01); *G11B 27/034* (2013.01); *G11B 27/11* (2013.01);
(Continued)

(58) Field of Classification Search
CPC ..... G11B 27/034; G11B 27/102; G11B 27/11; G11B 27/34; H04N 21/2387; H04N 21/43615; H04N 5/76
(Continued)

(56) References Cited

U.S. PATENT DOCUMENTS 6,968,158 B1 * 11/2005 Bhuta ................... H04W 4/20
                                                          455/566
7,535,465 B2 * 5/2009 Morse ................. G11B 27/105
                                                          345/204
(Continued)

FOREIGN PATENT DOCUMENTS

JP    H10-143976    5/1998
JP    2009-130638 A    6/2009
JP    2013-003327    1/2013

OTHER PUBLICATIONS

U.S. Appl. No. 14/333,858, filed Jul. 17, 2014, Ogawara.
(Continued)

*Primary Examiner* — Thai Tran
*Assistant Examiner* — Stephen Smith
(74) *Attorney, Agent, or Firm* — Oblon, McClelland, Maier & Neustadt, L.L.P.

(57) ABSTRACT

A display system includes a display device and an information terminal for communicating with the display device. The information terminal includes a generation unit that generates playback control information that includes information indicating a storing position of playback content data selected from content data stored in a storage part and is used to control playback of the playback content data, and a transmission unit that transmits the playback control information to the display device. The display device includes a display control unit that makes reference to the information indicating the storing position included in the playback control information received from the transmission unit, and plays back the playback content data according to the playback control information.

10 Claims, 14 Drawing Sheets

(51) Int. Cl.
    *G11B 27/034* (2006.01)
    *G11B 27/11* (2006.01)
    *H04N 21/2387* (2011.01)
    *H04N 21/436* (2011.01)
    *H04N 5/76* (2006.01)

(52) U.S. Cl.
    CPC ......... *G11B 27/34* (2013.01); *H04N 21/2387* (2013.01); *H04N 21/43615* (2013.01); *H04N 5/76* (2013.01)

(58) Field of Classification Search
    USPC ......... 386/230, 263; 348/558; 370/300, 310; 455/3.06, 41.2; 345/173; 710/33
    See application file for complete search history.

(56) References Cited

U.S. PATENT DOCUMENTS

| | | | | |
|---|---|---|---|---|
| 8,331,766 | B2* | 12/2012 | Ide | G06F 3/14 |
| | | | | 386/263 |
| 8,688,869 | B2* | 4/2014 | Choi | H04N 5/765 |
| | | | | 710/33 |
| 8,995,981 | B1* | 3/2015 | Aginsky | G08C 17/02 |
| | | | | 455/419 |
| 2005/0036509 | A1* | 2/2005 | Acharya | H04L 63/0428 |
| | | | | 370/466 |
| 2005/0212965 | A1* | 9/2005 | Stone | H04N 5/46 |
| | | | | 348/558 |
| 2011/0165841 | A1* | 7/2011 | Baek | H04L 67/10 |
| | | | | 455/41.2 |
| 2011/0222518 | A1* | 9/2011 | Ota | H04W 48/12 |
| | | | | 370/338 |
| 2011/0228715 | A1* | 9/2011 | Tsuji | H04N 21/2381 |
| | | | | 370/310 |
| 2012/0028569 | A1* | 2/2012 | Lim | H04N 21/4126 |
| | | | | 455/3.06 |
| 2012/0047538 | A1* | 2/2012 | Murase | H04N 5/05 |
| | | | | 725/81 |
| 2013/0050110 | A1* | 2/2013 | Jan | H04M 1/72527 |
| | | | | 345/173 |
| 2014/0104033 | A1* | 4/2014 | Griffiths | G05B 19/0426 |
| | | | | 340/4.3 |
| 2015/0070250 | A1* | 3/2015 | Chang | G06F 1/1626 |
| | | | | 345/2.3 |

OTHER PUBLICATIONS

U.S. Appl. No. 14/333,858, filed Jul. 17, 2014.
Office Action dated Jun. 6, 2017 in Japanese Patent Application No. 2013-153230.

* cited by examiner

FIG.5

| SETTING ITEM | SETTING RANGE | INITIAL VALUE |
|---|---|---|
| ORDER | — | — |
| TIME | 1 TO 30 SEC. (UNIT: 1 SEC.) | 5 SEC. |
| EFFECT | 0: FADE IN<br>1: PUSH TO LEFT<br>2: PUSH TO RIGHT<br>3: WIPE TO LEFT<br>4: WIPE TO RIGHT<br>5: NONE | FADE IN |

| ITEM | SETTING ITEM | DETAIL |
|---|---|---|
| VERSION | FORMAT VERSION | 1.0.0 |
| ORDER | PARAMETER OF SEQUENCE OF CONTENT DATA | 0: SPECIFIED<br>1: RANDOM |
| CONTENT LIST | ORDER OF PLAYBACK SETTING OF CONTENT DATA (IN CASE OF ORDER "0") | |
| PATH | LOCATION OF STORAGE OF CONTENT DATA (CHECK BY EXTENTION) | |
| TIME | PARAMETER OF SWITCHING INTERVAL OF CONTENT DATA | |
| EFFECT | PARAMETER OF EFFECT AT SWITCHING | 0: FADE IN<br>1: PUSH TO LEFT<br>2: PUSH TO RIGHT<br>3: WIPE TO LEFT<br>4: WIPE TO RIGHT<br>5: NONE<br>6: RANDOM |

FIG.7

```
{
  "version":"1.0.0","order":0,
  "contents_list":[
    {"path":"/QS/Playlist_1/file_1.jpeg","time":15,"effect":1},
    {"path":"/QS/Playlist_1/file_4.jpeg","time":15,"effect":2},
    {"path":"/QS/Playlist_1/file_2.jpeg","time":15,"effect":2},
    {"path":"/QS/Playlist_1/file_11.jpeg","time":5,"effect":2},
    {"path":"/QS/Playlist_1/file_113.jpeg","time":20,"effect":3}]
}
```
⎫
⎬ 332
⎭

FIG.13

```
{
"version":"1.0.0"," order":0,
"contents_list":[
 [ "path":"http://R.co.jp/QS/Playlist_1/file_1.jpeg"," time":15," effect":1],
 [ "path":"http://R.co.jp/QS/Playlist_1/file_4.jpeg"," time":15," effect":2],
 [ "path":"http://R.co.jp/QS/Playlist_1/file_2.jpeg"," time":15," effect":2],
 [ "path":"http://R.co.jp/QS/Playlist_1/file_11.jpeg"," time":5," effect":2],
 [ "path":"http://R.co.jp/QS/Playlist_1/file_113.jpeg"," time":20," effect":3]]
}
```
⎫
⎬ 332A
⎭

DISPLAY SYSTEM, INFORMATION TERMINAL, DISPLAY DEVICE, AND RECORDING MEDIUM

BACKGROUND OF THE INVENTION

1. Field of the Invention

The present invention relates to a display system, an information terminal, a display device, and a recording medium which are adapted to display content data.

2. Description of the Related Art

Conventionally, a method in which image data is supplied from an information terminal to a display device to display an image on the display device according to the image data is known. In this method, display setting values which were adjusted in advance on the display device for ordinary setting items are set up to display settings of the display device. In recent years, some proposals for eliminating the labor to adjust the display setting values of the display device in advance have been made.

One of the proposals according to the related art is a display control method in which display setting information to specify desired setting conditions associated with the image displaying is transmitted from the image-data supplying information terminal to the display device, and the display device is set up based on the received display setting information from the information terminal. For example, see Japanese Laid-Open Patent Publication No. 2013-003327.

However, in the above-described method, ordinary setting values associated with display luminance and color mode of the display device are simply set up based on the received display setting information. Therefore, when playing back content data including two or more images on the display device, it is difficult to set playback control information associated with the playback of the content data, such as the sequence of playback of the images or the playback time of the images, to the display device.

SUMMARY OF THE INVENTION

In one aspect, the present invention provides a display system, an information terminal, a display device, and a recording medium which are adapted to set playback control information associated with playback of content data to the display device.

In an embodiment which solves or reduces one or more of the above-described problems, the present invention provides a display system including a display device and an information terminal for communicating with the display device, the information terminal including a generation unit configured to generate playback control information that includes information indicating a storing position of playback content data selected from content data stored in a storage part and is used to control playback of the playback content data, and a transmission unit configured to transmit the playback control information to the display device, the display device including a display control unit configured to make reference to the information indicating the storing position included in the playback control information received from the transmission unit, and play back the playback content data according to the playback control information.

Other objects, features and advantages of the present invention will become more apparent from the following detailed description when read in conjunction with the accompanying drawings.

BRIEF DESCRIPTION OF THE DRAWINGS

FIG. 5 is a diagram showing an example of setting item information according to the first embodiment.

FIG. 6 is a diagram showing an example of a setting table according to the first embodiment.

FIG. 7 is a diagram showing an example of playback control information according to the first embodiment.

FIG. 13 is a diagram showing an example of playback control information according to the second embodiment.

DETAILED DESCRIPTION OF THE PREFERRED EMBODIMENTS

A description will be given of embodiments with reference to the accompanying drawings.

In one embodiment, playback control information for playing back content data is generated based on settings input by a user, the playback control information is transmitted to a display device, and the playback control information is set to the display device.

First Embodiment

Figure 1:
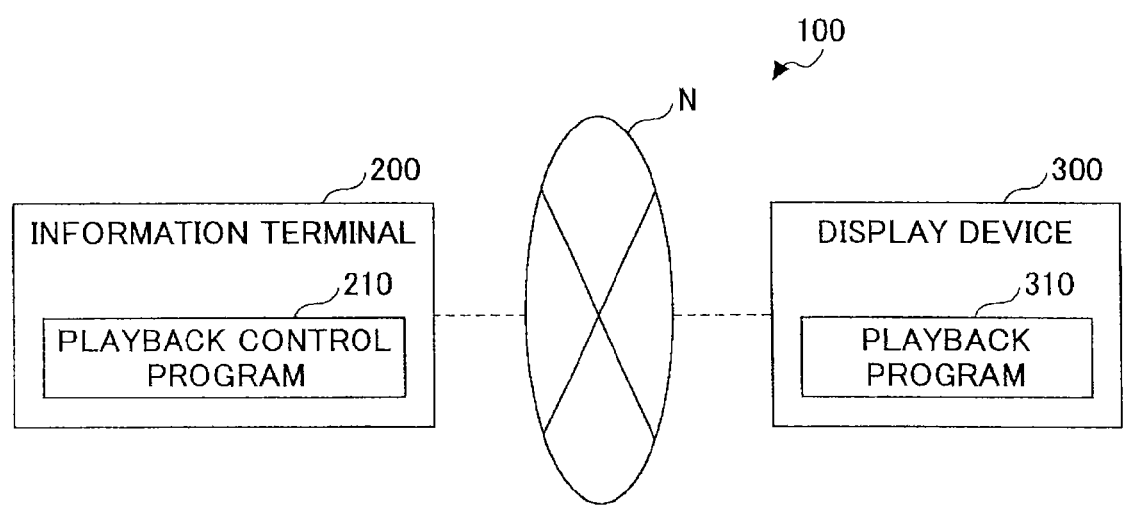
FIG. 1 is a diagram showing an overall configuration of a display system according to a first embodiment.

A first embodiment will be described. FIG. 1 is a diagram showing an overall configuration of a display system 100 according to the first embodiment. As shown in FIG. 1, the display system 100 includes an information terminal 200 and a display device 300, and the information terminal 200 and the display device 300 are connected via a data transmission path N, such as a network.

The information terminal 200 may perform communication according to a communication protocol complying with the communication standard such as 3G (3rd Generation), LTE (Long Term Evolution) or 4G (4th Generation). Moreover, the information terminal 200 may perform communication according to another communication protocol such as ZigBee or Bluetooth®.

The information terminal 200 may be implemented by a wireless communication terminal such as a smart phone or a mobile phone. Moreover, the information terminals 200 may be implemented by a tablet PC (personal computer) or a notebook PC. The information terminal 200 may be configured to communicate with the display device 300.

A playback control program 210 is installed in the information terminal 200. The playback control program 210 when executed by a processor of the information terminal 200 causes the processor to generate playback control information associated with content data to be displayed on the display device 300, and transmit the content data and the playback control information to the display device 300.

A playback program 310 is installed in the display device 300. The playback program 310 when executed by a processor of the display device 300 causes the processor to display the content data received from the information terminal 200 based on the playback control information.

The display device 300 may be configured to have at least a display function to display the content data based on the playback control information received from the information terminal 200. Specifically, the display device 300 may be implemented by a projector or a display unit.

In the following, operation of the display device 300 to display the content data based on the playback control information is expressed as playback of the content data. Moreover, the content data may be implemented by image data or video data. The image data used as the content data may be either image data indicating a single image or image data indicating two or more images. The content data may be implemented by any image data that is capable of being displayed on the display device 300.

In the following, content data which is played back by the display device 300 is called "playback content data", and other content data which is stored in a predetermined storage area is called "content data".

Figure 2:
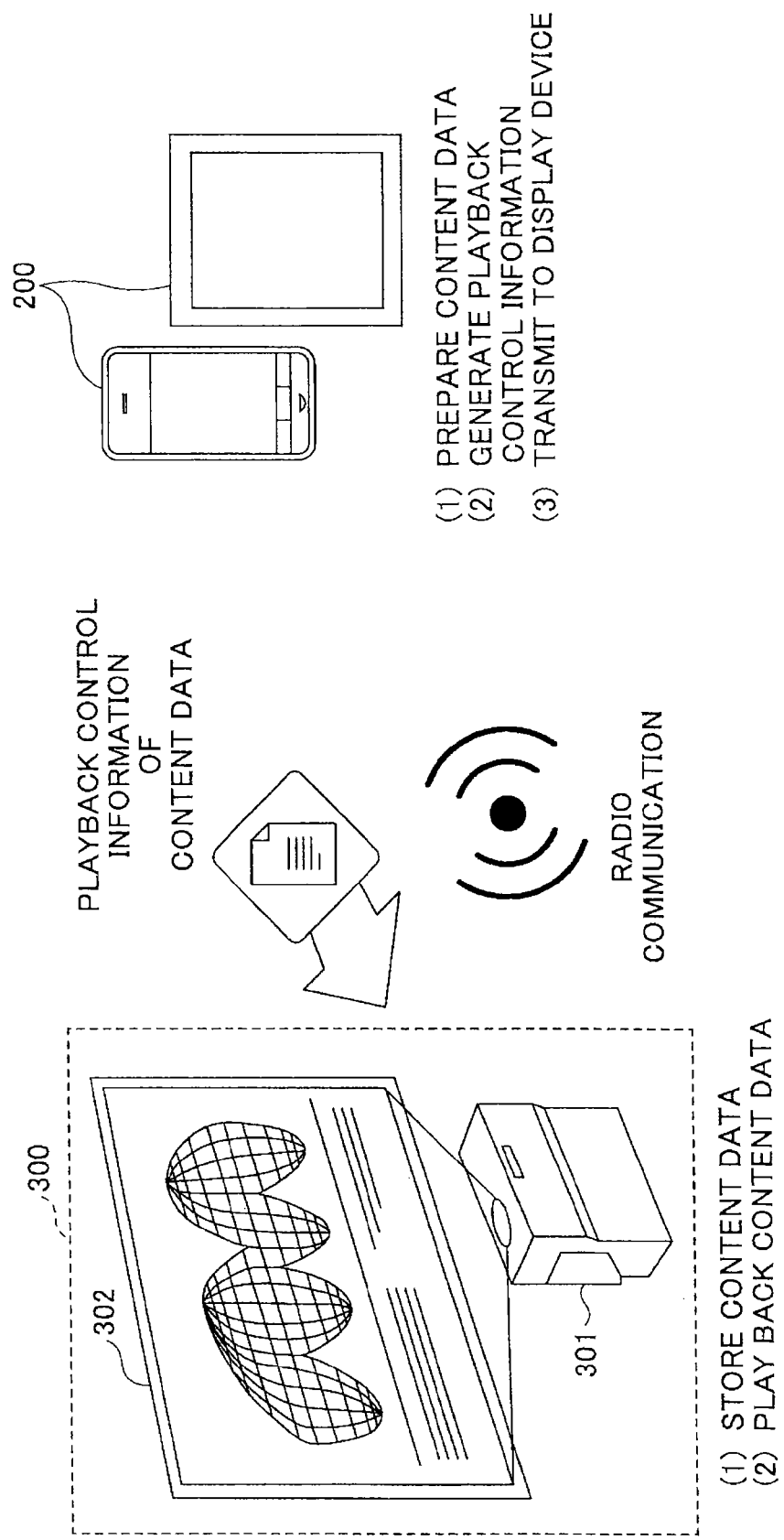
FIG. 2 is a diagram for explaining a scenario in which the display system according to the first embodiment is utilized.

Next, a scenario in which the display system 100 according to the first embodiment is utilized is explained with reference to FIG. 2. FIG. 2 is a diagram for explaining a scenario in which the display system 100 is utilized.

In the example of FIG. 2, it is assumed that the information terminal 200 is a smart phone or a tablet PC, the display device 300 is configured to include a projector 301 and a screen 302, and the display system 100 is utilized as a digital signage system.

After a desired playback setting of playing back the playback content data is input by a user, the information terminal 200 generates playback control information associated with the playback content data based on the playback setting. Moreover, the information terminal 200 transmits the playback content data and the playback control information to the projector 301. The projector 301 stores the received playback content data in a storage part and plays back the playback content data based on the playback control information.

In the display system 100 according to this embodiment, once the playback content data and the playback control information are transmitted to the display device 300 by the user, the playback content data is continuously played back by the display device 300 based on the desired playback setting. Namely, when the display system 100 is utilized as a digital signage system, the content data is automatically played back based on the user's desired playback setting, and it is no longer necessary for the user to spend the time and effort for setting up the sequence of displaying the content data or the switching of the content data to be displayed on an as-needed basis.

Figure 3:
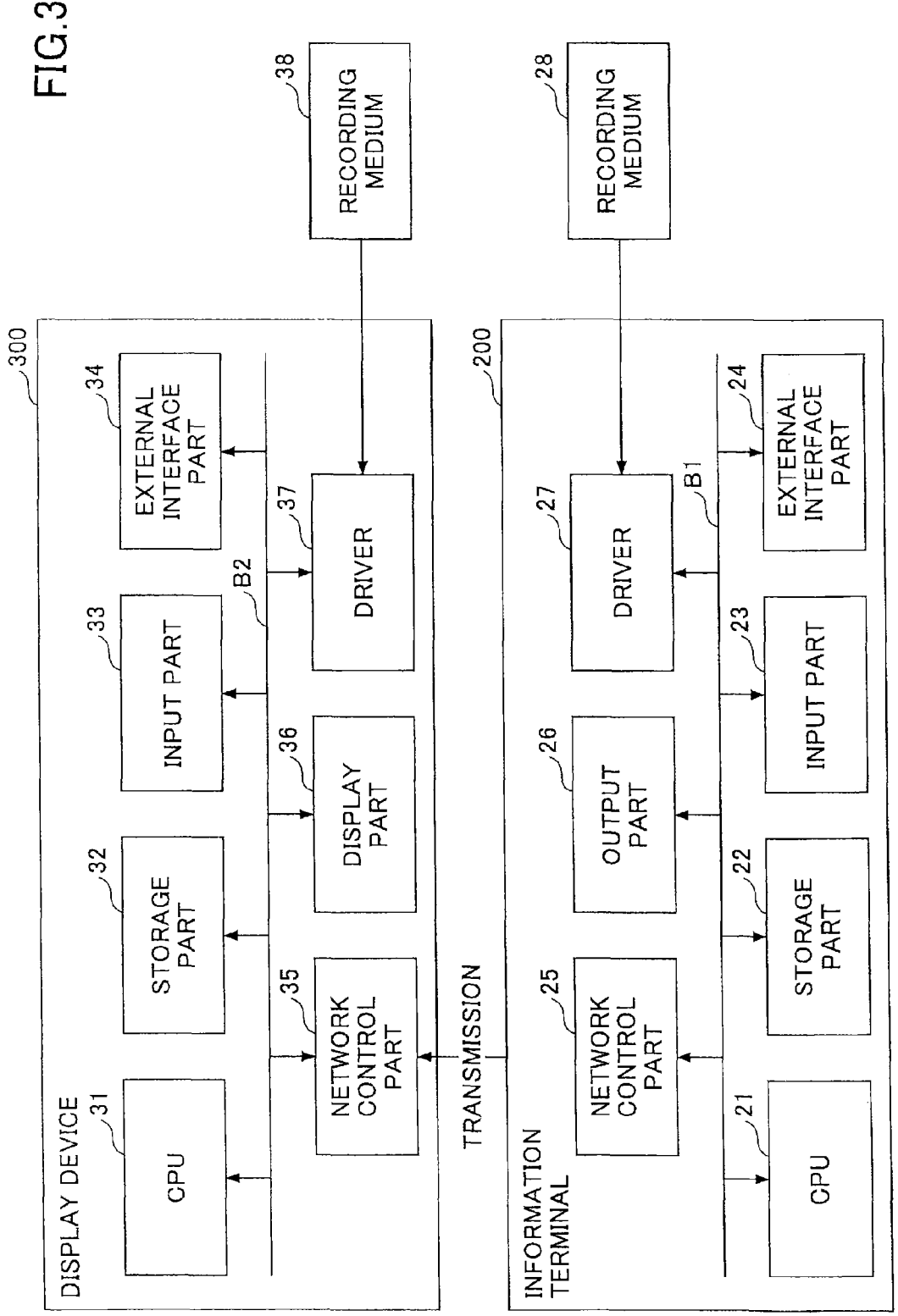
FIG. 3 is a diagram showing a hardware configuration of each of an information terminal and a display device of the display system according to the first embodiment.

Next, a hardware configuration of the display system 100 according to the first embodiment is explained with reference to FIG. 3. FIG. 3 is a diagram showing a hardware configuration of each of the information terminal 200 and the display device 300 of the display system 100.

As shown in FIG. 3, the information terminal 200 includes a central processing unit (CPU) 21, a storage part 22, an input part 23, an external interface part 24, a network control part 25, an output part 26, and a driver 27. These components of the information terminal 200 are interconnected by a bus B1.

The CPU 21 is configured to control overall operations of the information terminal 200. The storage part 22 is configured to store various programs executed by the CPU 21 and various information items associated with operations and computations of the information terminal 200. The input part 23 is configured to receive various signals and information items input by a user. The input part 23 may be configured to have a display function such as a touch panel function. Moreover, the input part 23 may be implemented by a pointing device or a keyboard.

The external interface part 24 may be implemented by a USB (universal serial bus) memory slot or an NFC (near field communication) module. The network control part 25 is configured to include a modem or a LAN card and used to connect the information terminal 200 to the network. The output part 26 is configured to output various information items from the information terminal 200. The output part 26 may be implemented by a display unit, or may be implemented by a transmission unit to transmit various data items to an external device.

The playback control program 210 is at least a part of the various programs stored to control the information terminal 200. The playback control program 210 is supplied to the information terminal 200 by distribution of a recording medium 28 or by downloading the playback control program 210 from the network. Examples of the recording medium 28 in which the playback control program 210 is recorded include a CD-ROM, a flexible disk, a magneto-optical disk, a ROM, a flash memory, etc.

If the recording medium 28 in which the playback control program 210 is recorded is set to the driver 27, the playback control program 210 from the recording medium 28 is installed in the storage part 22 through the driver 27. If the playback control program 210 is downloaded from the network, the playback control program 210 is installed in the storage part 22 through the network control part 25.

The storage part 22 is configured to store necessary files and data items as well as the installed playback control program 210. The playback control program 210 when read from the storage part 22 and executed by the CPU 21 causes the CPU 21 to perform various processes which will be described later.

Moreover, as shown in FIG. 3, the display device 300 includes a CPU 31, a storage part 32, an input part 33, an external interface part 34, a network control part 35, a display part 36, and a driver 27. These components of the display device 300 are interconnected by a bus B2.

The CPU 31 is configured to control overall operations of the display device 300. The storage part 32 is configured to store various programs executed by the CPU 31, content data to be played back on the display device 300, and various information items associated with operations and computations of the display device 300. The input part 33 is configured to receive various signals and information items input by a user. The input part 33 may be implemented by an operation unit to operate the display device 300.

The external interface part 34 may be implemented by a USB memory slot or an NFC module. The network control part 35 is configured to connect the display device 300 to the network. The display part 36 is configured to display the content data on the display device 300 in accordance with a display instruction which specifies the content data.

The playback program 310 is at least a part of the various programs stored to control the display device 300. The playback program 310 is supplied to the display device 300 by distribution of a recording medium 38 or by downloading the playback program 310 from the network.

Moreover, if the recording medium 38 in which the playback program 310 is recorded is set to the driver 37, the playback program 310 from the recording medium 38 is installed in the storage part 33 through the driver 37. If the playback program 310 is downloaded from the network, the playback program 310 is installed in the storage part 33 through the network control part 35.

The storage part 33 is configured to store necessary files and data items as well as the installed playback program 310. The playback program 310 when read from the storage part 33 and executed by the CPU 31 causes the CPU 31 to perform various processes which will be described later.

Figure 4:
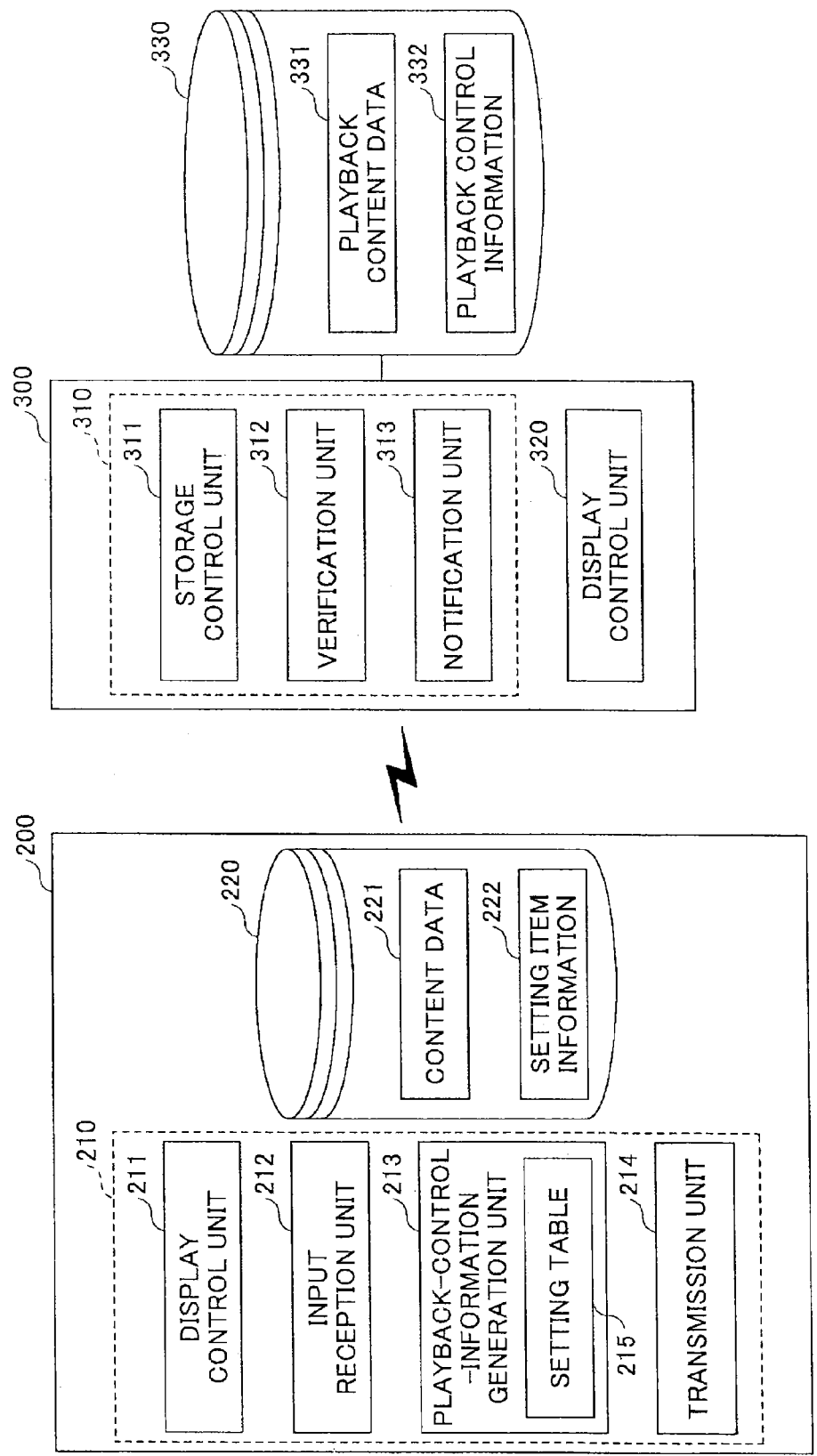
FIG. 4 is a diagram showing a functional configuration of each of the information terminal and the display device of the display system according to the first embodiment.

Next, a functional configuration of each of the information terminal 200 and the display device 300 of the display system 100 according to the first embodiment is explained with reference to FIG. 4. FIG. 4 is a diagram showing a functional configuration of each of the information terminal 200 and the display device 300 of the display system 100.

As shown in FIG. 4, the information terminal 200 includes a predetermined storage area 220 which is provided in the storage part 22. For example, content data 221 and setting item information 222 are stored in the storage area 220. The content data 221 may be image data that is capable of being displayed on the display device 300. The content data 221 may be implemented by image data or video data. The setting item information 222 may be information which indicates setting items in the playback control information input by the user. The details of the setting item information 222 will be described later.

Moreover, the information terminal 200 includes a display control unit 211, an input reception unit 212, a playback-control-information generation unit 213, and a transmission unit 214.

The display control unit 211 is configured to display a list screen of the content data 221 and a setting screen for inputting values of the setting items included in the setting item information 222, on the display unit which is the output part 26 of the information terminal 200.

The input reception unit 212 is configured to receive content data items selected by the user from the list screen in which the list of the content data 221 is displayed. In this embodiment, the content data 221 selected from the list screen displayed on the information terminal 200 is transmitted to the display device 300 as playback content data 331 which is to be played back on the display device 300. Moreover, the input reception unit 212 is configured to receive values of the setting items which are input into the setting screen by the user, the setting screen being displayed on the information terminal 200 for setting the values of the setting items included in the setting item information 222.

The playback-control-information generation unit 213 is configured to generate playback control information 332 based on information included in the playback content data 331. Specifically, the playback-control-information generation unit 213 holds a setting table 215 in which respective values of the setting items are associated with the setting items included in the playback control information 332, and generates the playback control information 332 in a predetermined format by making reference to the setting table 215.

In this embodiment, the setting items included in the setting item information 222 are a part of the setting items included in the playback control information 332. Namely, the values which are input by the user to the setting items included in the setting item information 222 are included in the playback control information 332. A process performed by the playback-control-information generation unit 213 will be described later.

The transmission unit 214 is configured to transmit the playback content data 331 and the generated playback control information 332 to the display device 300.

In the information terminal 200 according to the first embodiment, the content data 221 is stored in the storage part 22. The present disclosure is not limited to this embodiment. For example, the content data 221 may be stored in a removable recording medium that is accessible by the information terminal 200, or may be stored in an external device that is configured to communicate with the information terminal 200.

Moreover, as shown in FIG. 4, the display device 300 includes a storage control unit 311, a verification unit 312, and a notification unit 313. The display device 300 further includes a display control unit 320 which is configured to control the display part 36.

Furthermore, the display device 300 includes a storage area 330 in which the playback content data 331 and the playback control information 332, received from the information terminal 200, are stored. Alternatively, the storage area 330 may be provided in the storage part 32 of the display device 300, or may be provided in a removable recording medium which is accessible by the display device 300. Further, the storage area 330 may be provided in an external device that is configured to communicate with the display device 300.

The storage control unit 311 is configured to store in the storage area 330 the playback content data 331 and the playback control information 332 which are received from the information terminal 200. Moreover, the storage control unit 311 is configured to set the values of the setting items included in the playback control information 332 to the display device 300 in response to a playback instruction for the playback content data 331 received from the information terminal 200.

The verification unit 312 is configured to verify that the playback content data 331 is capable of being played back on the display device 300 based on the playback control information 332. A process performed by the verification unit 312 will be described later. The notification unit 313 is configured to send a notification indicating a verification result to the information terminal 200.

Next, generation of the playback control information by the playback-control-information generation unit 213 is explained. FIG. 5 is a diagram showing an example of the setting item information 222 according to the first embodiment.

As shown in FIG. 5, the setting item information 222 in this example includes setting items ORDER, TIME, and EFFECT.

The setting item ORDER indicates the sequence of playback of items of the content data 221 included in the playback content data 331. In this embodiment, when the value of the setting item ORDER is 0, the sequence of playback of the items of the content data 221 included in the playback content data 331 is set to a specified sequence.

Moreover, when the value of the setting item ORDER is 1, the sequence of playback of the items of the content data 221 included in the playback content data 331 is set to a random sequence.

Incidentally, the sequence of playback of the items of the content data 221 may be in agreement with the sequence of selection of items of the playback content data 331 from the list screen of the content data 221.

The setting item TIME indicates a playback time of the content data 221 included in the playback content data 331.

The setting item EFFECT indicates how to switch between the display indications of the content data 221 included in the playback content data 331.

In the information terminal 200 according to this embodiment, the display control unit 211 is configured to display the setting screen of each of the setting items based on the setting item information 222. The details of the setting screen will be described later.

In the following, a case in which three content data items 221*a*, 221*b*, and 221*c* are selected in this order from the content data 221 stored in the storage area 220 in the information terminal 200 is considered.

In this case, the playback content data 331 is a set of the content data items 221*a*, 221*b*, and 221*c*. When the value of the setting item ORDER is 0, the sequence of playback of the content data items 221*a*, 221*b*, and 221*c* is set to the sequence of selection of the content data items. When the value of the setting item ORDER is 1, the sequence of playback of the content data items 221*a*, 221*b*, and 221*c* is set to a random sequence. In this embodiment, the value of the setting item ORDER is set beforehand to 0 as an initial value.

In the setting item TIME, the playback time of each of the content data items 221*a*, 221*b*, and 221*c* is set up. In this embodiment, the setting item TIME is set beforehand to 5 seconds as an initial value.

For example, in the setting item EFFECT, how to switch from the display indication of the content data item 221*a* on the display device 300 to that of the content data item 221*b* is set up in a case in which the sequence of playback of the content data items 221*a*, 221*b*, and 221*c* is specified to this order. Moreover, in the setting item EFFECT, how to switch from the display indication of the content data item 221*b* on the display device 300 to that of the content data item 221*c* is set up in the same case. In this embodiment, the setting item EFFECT is set beforehand to FADE IN as an initial value. The FADE IN is a method of switching between the display indications by a gradual change in resolution of the playback image.

Moreover, in this embodiment, the setting item EFFECT may be set to any of other modes of the way of switching between the display indications, such as PUSH TO LEFT, PUSH TO RIGHT, WIPE TO LEFT, and WIPE TO RIGHT. The PUSH TO LEFT is a method of switching between the display indications by pushing the preceding display indication to the left end and presenting the following display indication. The PUSH TO RIGHT is a method of switching between the display indications by pushing the preceding display indication to the right end and appearing the following display indication. The WIPE TO LEFT is a method of switching between the display indications by presenting the following display indication while wiping off the preceding display indication to the left end. The WIPE TO RIGHT is a method of switching between the display indications by presenting the following display indication while wiping off the preceding display indication to the right end.

In this embodiment, the values of the setting items included in the setting item information 222 may be collectively set to all the items of the content data 221 included in the playback content data 331. Alternatively, the values of the setting items included in the setting item information 222 may be set to each of the items of the content data 221 included in the playback content data 331.

FIG. 6 is a diagram showing an example of the setting table 215 according to the first embodiment. As shown in FIG. 6, the setting table 215 includes additional setting items VERSION, CONTENT LIST, and PATH as well as the setting items ORDER, TIME, and EFFECT included in the setting item information 222.

The setting item VERSION indicates a version of the format used when the playback control information 332 is generated. In order to display the playback content data 331 on the display device 300, it is assumed that the value of the setting item VERSION is equivalent to the value of a version of the format used in the display device 300.

The setting item CONTENT LIST indicates the arrangement of playback settings of the content data. For example, this arrangement may be expressed by the sequence of storing of the items of the content data 221 included in the playback content data 331 into the storage area 330, or by the sequence of selection of the items of the content data 221 from the list screen of the content data 221. It is assumed that the setting items VERSION and CONTENT LIST are set up beforehand in the setting table 215.

The setting item PATH indicates a storing position of each of the items of the content data 221 included in the playback content data 331. In this embodiment, when an item of the content data 221 is selected, a storing position of the selected content data item is set to the setting table 215 as a value of the setting item PATH. Moreover, a filename of the selected content data item may be included in the value of the setting item PATH.

When the values of the setting items in the setting item information 222 are input by the user, the playback-control-information generation unit 213 associates the user's input values with the values of the corresponding setting items in the setting table 215. Thereafter, the playback-control-information generation unit 213 generates the playback control information 332 by making reference to the setting table 215.

In this embodiment, some of the setting items included in the setting table 215 are included in the setting item information 222. However, the present disclosure is not limited to this embodiment. For example, all the setting items included in the setting table 215 may be included in the setting item information 222. Namely, in such a case, the values of all the setting items included in the setting table 215 may be input by the user.

FIG. 7 is a diagram showing an example of the playback control information 332 according to the first embodiment.

After the values of the setting items in the setting table 215 are input by the user, the playback-control-information generation unit 213 generates the playback control information 332 in a predetermined format including all the values of the setting items.

In the example of FIG. 7, the predetermined format is JSON (JavaScript Object Notation) which is an open standard format that uses human-readable text to transmit data objects including attribute-value pairs. JSON is used primarily to transmit data between a server and a web application, as an alternative to XML (extensible markup language). The format of the playback control information 332 in this embodiment is readable by the CPU 31 of the display device 300.

In the example of FIG. 7, the value of the setting item VERSION is 1.0.0, the value of the setting item ORDER is 0, and the five content data items 221 included in the playback content data 331 are arrayed in the sequence of playback as the value of the setting item CONTENT LIST. Specifically, the value of the setting item CONTENT LIST is expressed by a value of the path of each of the items of the content data 221 included in the playback content data 331, a value of the setting item TIME, and a value of the setting item EFFECT.

As described above, in this embodiment, the playback control information 332 including the user's input values is generated, and the playback control information 332 is transmitted to the display device 300. Therefore, in this embodiment, the method of playback in the user's desired mode may be set to the display device 300.

The playback control information 332 shown in FIG. 7 is merely an example, and the playback control information 332 is not limited to this example. It is adequate for the playback control information 332 to include at least the storing position of the content data 221 included in the playback content data 331.

Figure 8:
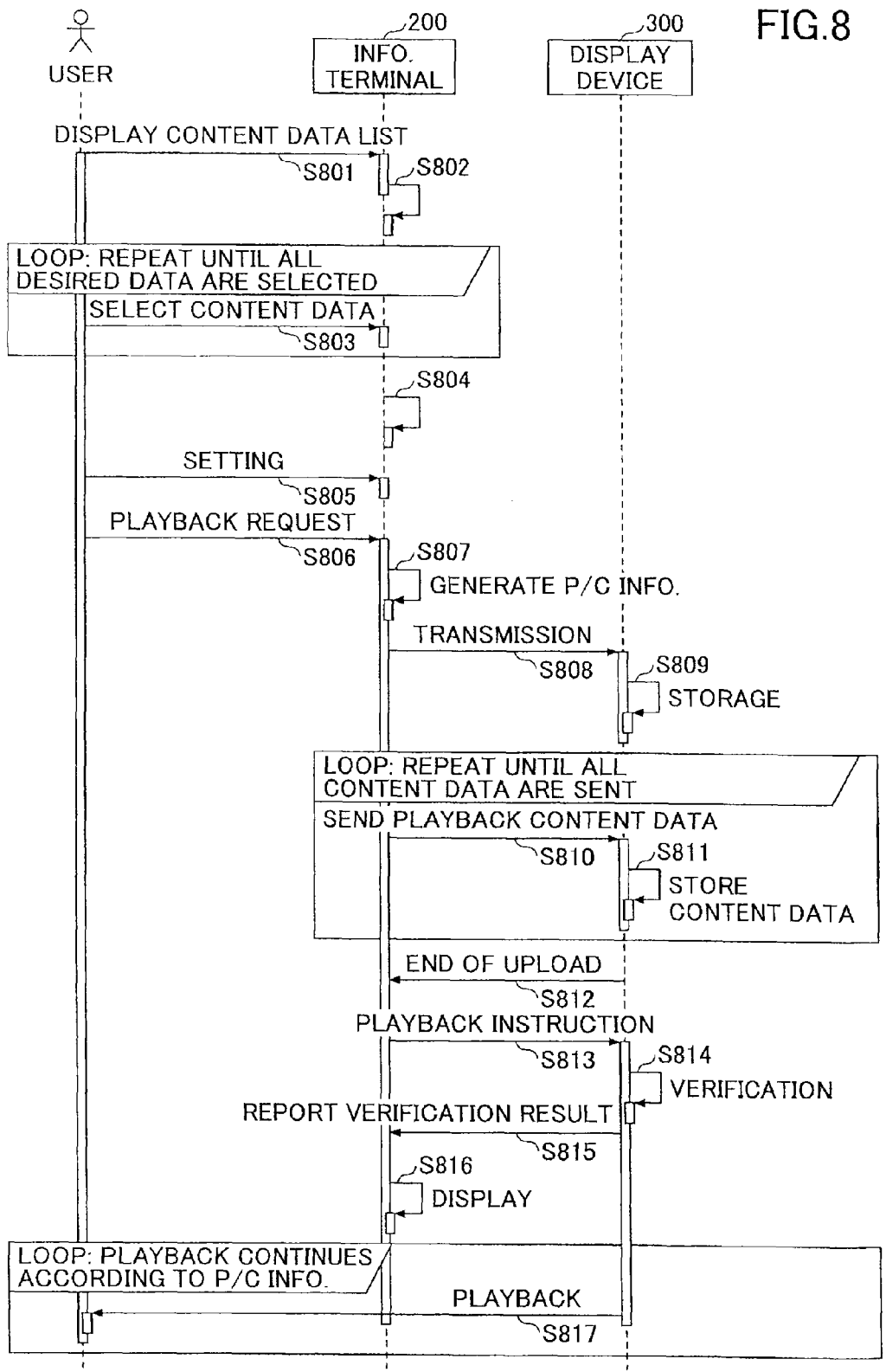
FIG. 8 is a sequence diagram for explaining operation of the display system according to the first embodiment.

Next, operation of the display system 100 according to the first embodiment is explained with reference to FIG. 8. FIG. 8 is a sequence diagram for explaining operation of the display system 100 according to the first embodiment.

In the display system 100, if a user inputs a content data list display instruction associated with the content data 221 to the information terminal 200 (step S801), the information terminal 200 causes the display control unit 211 to display the list screen of the content data 221 (step S802). The details of the list screen will be described later.

Subsequently, the information terminal 200 causes the input reception unit 212 to receive selection of the content data 221 from the list screen input by the user (step S803). In the information terminal 200, the processing of step S803 is repeated until the user's selection of the content data 221 is finished. A set of content data items selected by the user at step S803 constitutes the playback content data 331.

Subsequently, the information terminal 200 causes the display control unit 211 to display a setting screen of the setting items included in the setting item information 222 by making reference to the setting item information 222 (step S804). The details of the setting screen will be described later.

Subsequently, the information terminal 200 causes the input reception unit 212 to receive the values of the setting items input by the user in the setting screen (step S805). The user's input values of the setting items are associated with the corresponding setting items in the setting table 215, and the setting table 215 is stored. The setting items included in the setting item information 222 are as described above.

Subsequently, if a playback instruction associated with the playback content data 331 input by the user is received (step S806), the information terminal 200 causes the playback-control-information generation unit 213 to generate the playback control information 332 (step S807). Specifically, if the playback instruction input by the user is received, the playback-control-information generation unit 213 substitutes the values of the setting items stored in the setting table 215 into a predetermined format, and generates the playback control information 332.

Subsequently, the information terminal 200 causes the transmission unit 214 to transmit the playback control information 332 to the display device 300 (step S808).

After the playback control information 332 is received from the information terminal 200, the display device 300 causes the storage control unit 311 to store the playback control information 332 in the storage area 330 (step S809).

Subsequently, the information terminal 200 causes the transmission unit 214 to transmit the playback content data 331 to the display device 300 (step S810). The display device 300 causes the storage control unit 311 to store the playback content data 331 in the storage area 330 (step S811). For example, in this embodiment, a folder corresponding to the information terminal 200 is provided in the storage area 330, and the playback content data 331 and the playback control information 332 may be stored in this folder.

Subsequently, the display device 300 causes the notification unit 313 to send to the information terminal 200 a notification indicating that storage (upload) of the playback content data 331 in the storage area 330 is finished (step S812).

After this notification is received from the display device 300, the information terminal 200 transmits a playback instruction associated with the playback content data 331 to the display device 300 (step S813). After the playback instruction is received from the information terminal 200, the display device 300 incorporates the values of the setting items included in the playback control information 332, so that playback of the playback content data 331 may be performed based on the playback control information 332.

Moreover, after the playback instruction is received, the display device 300 causes the verification unit 312 to verify that the playback content data 331 is capable of being played back based on the playback control information 332 (step S814).

Next, verification of the playback content data 331 by the verification unit 312 is explained. The verification unit 312 accesses the playback control information 332 and determines whether the playback control information 332 is in a format that is readable by the display device 300. Moreover, the verification unit 312 accesses the playback control information 332, determines whether the value of the setting item VERSION is in agreement with that of the display device 300, and determines whether the path of the content data 221 is included in the playback control information 332.

Subsequently, the display device 300 causes the notification unit 313 to report a verification result obtained by the verification unit 312 to the information terminal 200 (step S815). Specifically, the notification unit 313 may send to the information terminal 200 a notification indicating that the transmission of the content data has been performed successfully, when it is determined in step S814 that the playback content data 331 is capable of being played back. After the notification from the notification unit 313 is received, the information terminal 200 displays a result of the verification (step S816).

On the other hand, when it is determined in step S814 that the playback content data 331 is not capable of being played back, the notification unit 313 sends to the information terminal 200 a notification indicating that the transmission has failed. For example, the playback content data 331 is not capable of being played back when the path of the content data 221 is not included in the playback control information 332, when the playback control information 332 is in a format which is not readable by the display device 300, or when the value of the setting item VERSION is not in agreement with that of the display device 300.

In this embodiment, when the transmission has failed, a message requesting the user to re-transmit the playback content data 331 is displayed on the information terminal 200. When re-transmission of the playback content data 331 is performed, the processing of steps S804-S808 may be repeated in the information terminal 200. Moreover, when re-transmission of the playback content data 331 is performed, the information terminal 200 may transmit the playback content data 331 with only the values of the setting items included in the setting item information 222 to the display device 300. In this case, the display device 300 may store the values of the setting items in the corresponding setting items of the playback control information 332, and may cause the verification unit 312 to perform the verification again.

After step S816 is performed, the display device 300 plays back the playback content data 331 based on the playback control information 332 (step S817).

In the example of FIG. 8, the information terminal 200 transmits the playback control information 332 to the display device 300, and thereafter transmits the playback content data 331 to the display device 300. However, the present disclosure is not limited to this example. For example, the information terminal 200 may transmit both the playback content data 331 and the playback control information 332 associated with the playback content data 331 to the display device 300 simultaneously.

Moreover, in the example of FIG. 8, after the content data items are selected from the list screen and the values of the setting items of the setting item information 222 are set up, the playback control information 332 is generated. However, the present disclosure is not limited to this example. For example, the information terminal 200 may generate the playback control information 332 concurrent with the selection of the content data items and the setting of the values of the setting items of the setting item information 222.

Moreover, the setting of the values of the setting items of the setting item information 222 may be performed when execution of the playback control program 210 is started. Alternatively, the setting of the values of the setting items of the setting item information 222 may be performed immediately after the content data list display instruction associated with the content data 221 is received. It is adequate that the setting of the values of the setting items of the setting item information 222 is finished prior to the generation of the playback control information 332.

Figure 9:
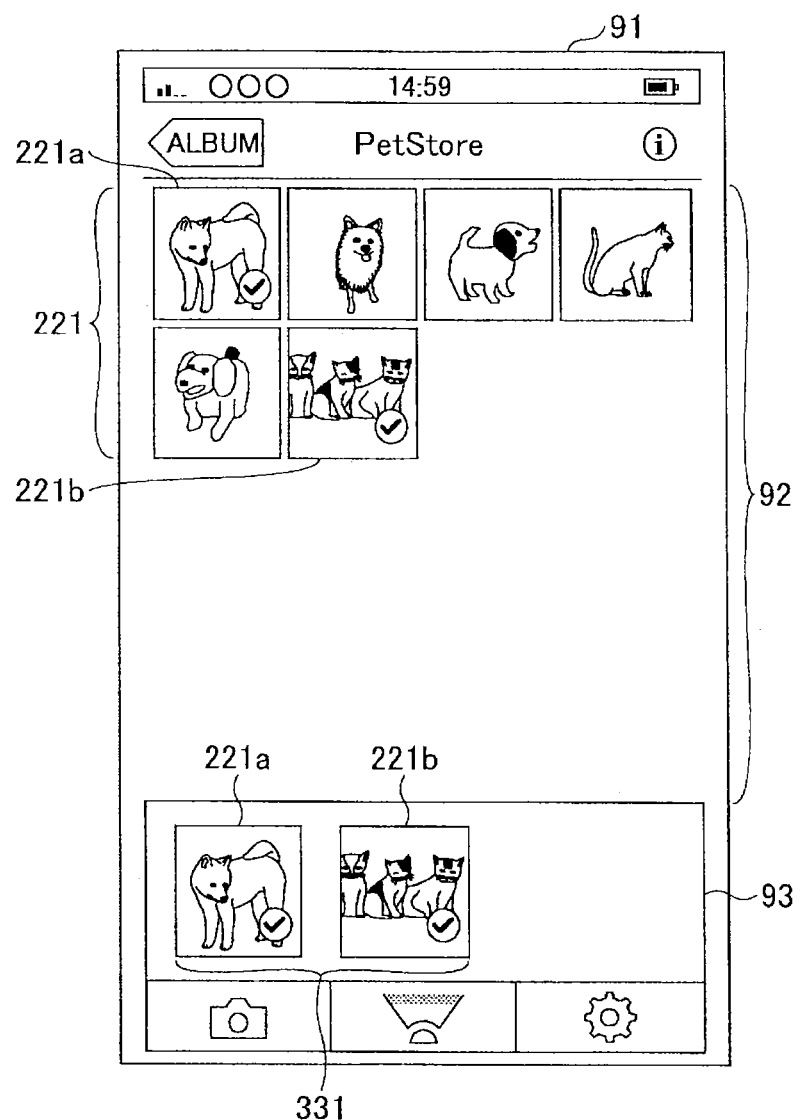
FIG. 9 is a diagram showing an example of a content data list screen displayed on the information terminal according to the first embodiment.

Next, examples of the screens displayed on the information terminal 200 are explained. FIG. 9 is a diagram showing an example of a content data list screen 91 displayed on the information terminal 200 according to the first embodiment.

As shown in FIG. 9, the content data list screen 91 includes a viewing area 92 where a list of the content data 221 stored in the storage area 220 is displayed, and a viewing area 93 where the playback content data 331 selected from the viewing area 92 is displayed. Alternatively, a list of thumbnails of the content data 221 may be displayed in the viewing area 92. Similarly, a list of thumbnails of the content data 221 selected from the viewing area 92 may be displayed in the viewing area 93.

In the example shown in FIG. 9, the content data items 221*a* and 221*b* are selected from the list of the content data 221 displayed in the viewing area 92 of the list screen 91. The selected content data items 221*a* and 221*b* are displayed in the viewing area 93 as the playback content data 331. Moreover, checks which indicate the user's selection may be superimposed on the thumbnails of the content data items 221*a* and 221*b* in the viewing area 92.

In this embodiment, the content data items 221*a* and 221*b* are played back by the sequence of being displayed in the viewing area 93.

The sequence in which the items of the content data 221 are displayed in the viewing area 93 may be in agreement with the sequence in which the items of the content data 221 are selected from the viewing area 92. The sequence in which the items of the content data 221 are displayed in the viewing area 93 may be arbitrarily altered by the user.

Figure 10:
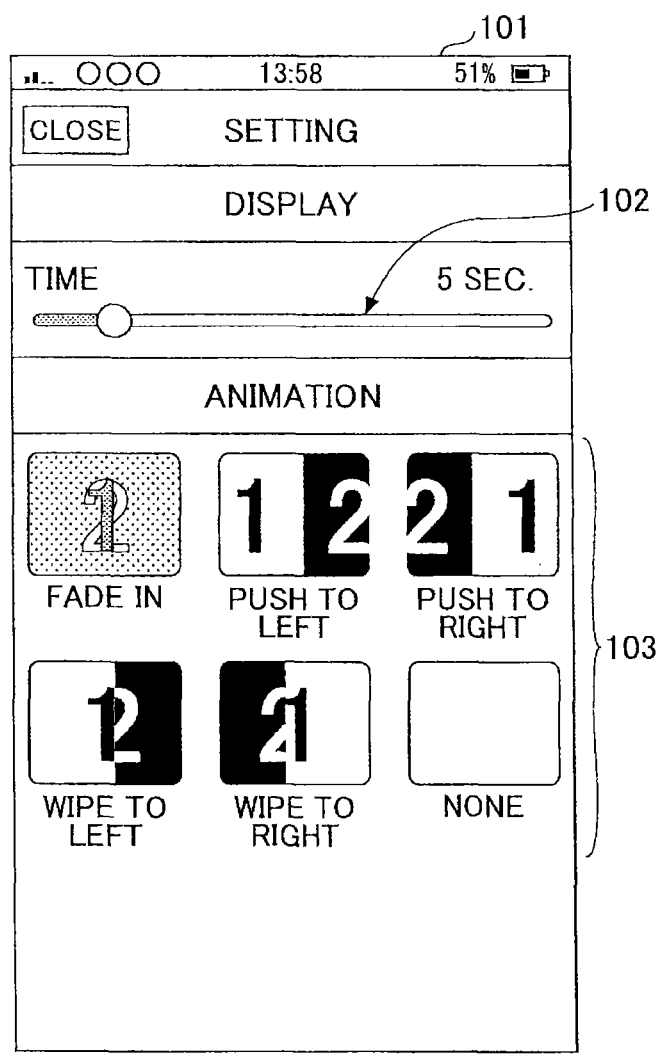
FIG. 10 is a diagram showing an example of a setting screen displayed on the information terminal according to the first embodiment.

FIG. 10 is a diagram showing an example of a setting screen 101 displayed on the information terminal 200 according to the first embodiment.

As shown in FIG. 10, the setting screen 101 includes a viewing area 102 where a value of the setting item TIME included in the setting item information 222 is input by a user, and a viewing area 103 where a value of the setting item EFFECT is input by a user.

In the example of FIG. 10, a slider is used as a user interface for setting a value of the setting item TIME. Moreover, in the example of FIG. 10, an icon of animation indicating how to switch between the display indications of the content data 221 and associated with a corresponding setting item value is used as a user interface for setting a value of the setting item EFFECT.

In this embodiment, the user interfaces which may be visually recognized by a user with ease are provided so that the user may easily set up values of the setting items.

In the display system 100 according to the first embodiment, the information terminal 200 transmits, to the display device 300, the playback content data 331 including the content data 221 selected by the user, and the playback control information 332 including the values of the setting items input by the user. Hence, the display device 300 sets up the information associated with the playback of the playback content data 331 based on the playback control information 332 received from the information terminal 200, and plays back the playback content data 331 according to the playback control information 332.

As described above, in the display system 100 according to the first embodiment, the information associated with the playback of the content data conforming to the user's preference may be set to the display device 300.

Second Embodiment

A second embodiment will be described. A display system according to the second embodiment differs from the display system 100 according to the first embodiment in that the content data 221 is provided from a content provision server to the information terminal. The rest of the configuration of the display system according to the second embodiment is essentially the same as that of the display system 100 according to the first embodiment, and a description thereof will be omitted. Only the points of the second embodiment which are different from the first embodiment will be described. In the following, the elements which are essentially the same as corresponding elements in the first embodiment are designated by the same reference numerals, and a description thereof will be omitted.

Figure 11:
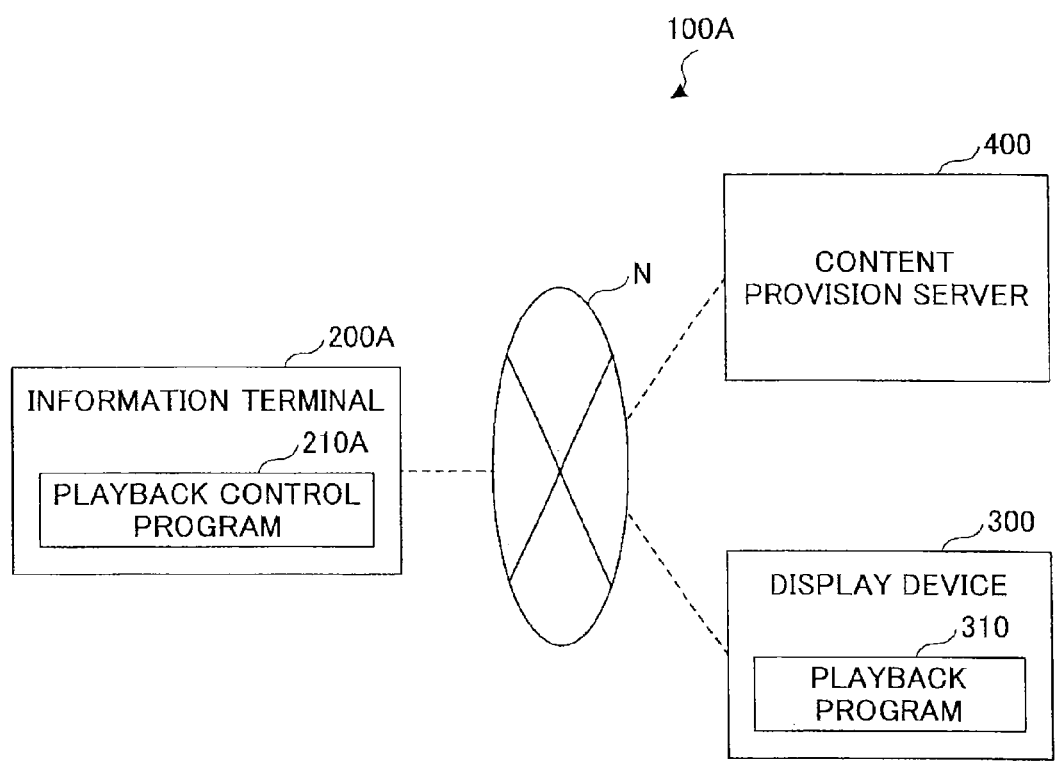
FIG. 11 is a diagram showing an overall configuration of a display system according to a second embodiment.

FIG. 11 is a diagram showing an overall configuration of a display system 100A according to the second embodiment. As shown in FIG. 11, the display system 100A includes an information terminal 200A, the display device 300, and a content provision server 400.

A playback control program 210A is installed in the information terminal 200A. The playback control program 210A when executed by a processor of the information terminal 200A causes the processor to acquire a content data list from the content provision server 400 for allowing a user to select from the content data list the content data to be played back on the display device 300, generate playback control information associated with the selected playback content data, and transmit the playback control information to the display device 300.

The content provision server 400 may be implemented by a server existing on the network and configured to supply content data in response to a content data acquisition request.

Specifically, in the display system 100A, the playback content data 331 is supplied from the content provision server 400 to the display device 300, and the information transmitted from the information terminal 200A to the display device 300 is only the playback control information. Hence, in the display system 100A, the time of communication between the information terminal 200A and the display device 300 may be reduced, and the user on the information terminal 200A may set up a method of playback of the desired playback content data 331 to the display device 300 in a short time.

Figure 12:
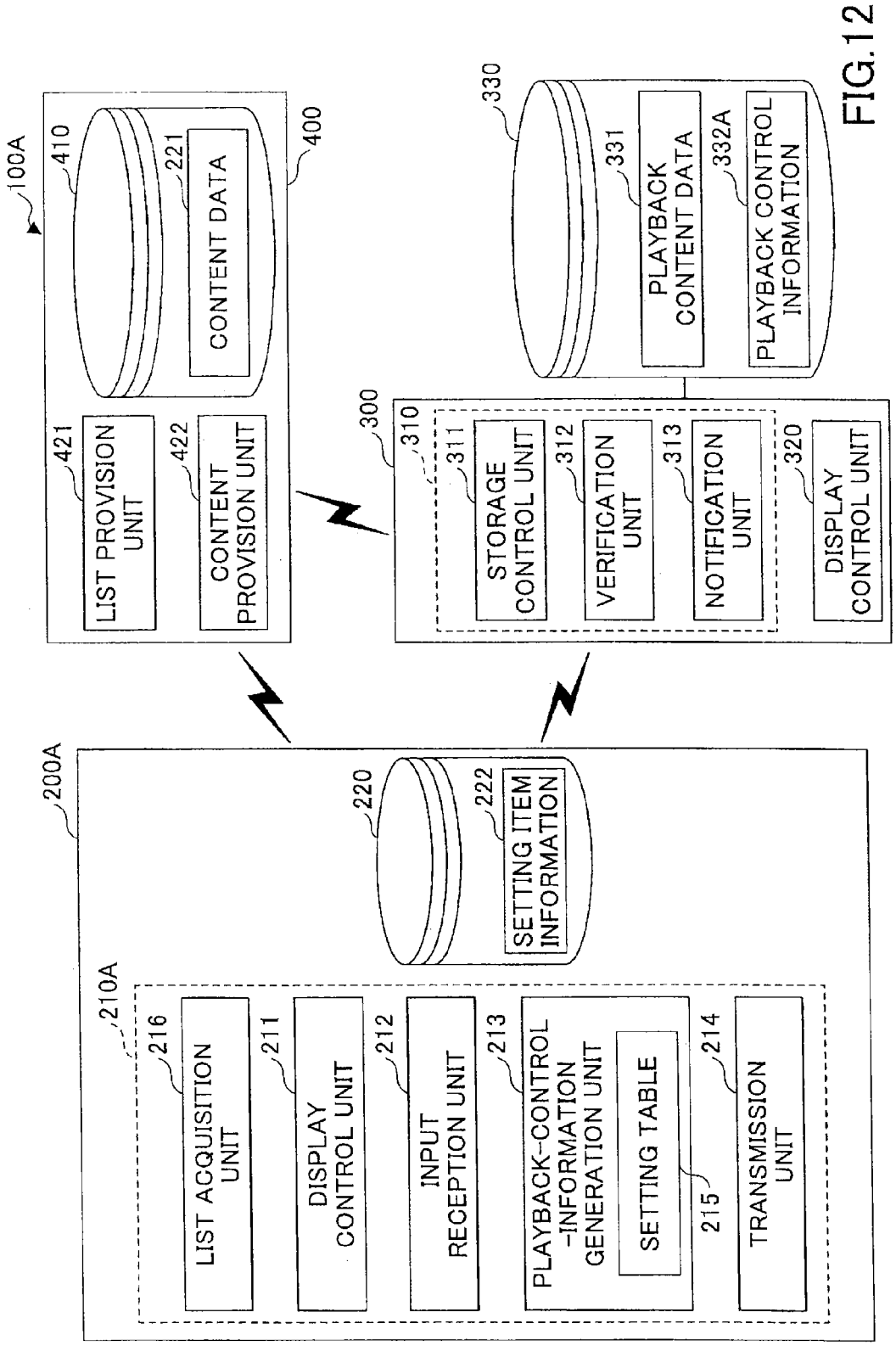
FIG. 12 is a diagram showing a functional configuration of each of an information terminal, a display device, and a content provision server of the display system according to the second embodiment.

FIG. 12 is a diagram showing a functional configuration of each of the information terminal 200A, the display device 300, and the content provision server 400 of the display system 100A according to the second embodiment.

As shown in FIG. 12, the information terminal 200A includes a list acquisition unit 216 in addition to the respective units of the information terminal 200 according to the first embodiment. The information terminal 200A includes no content data 221 in the storage area 220. In the storage area 220, only the setting item information 222 is stored.

The list acquisition unit 216 is configured to acquire a list of the content data 221 stored in the content provision server 400 when a content data list acquisition request associated with the content data 221 is received from a user.

The display control unit 211 is configured to display a content data list screen based on the content data list acquired by the list acquisition unit 216. The playback-control-information generation unit 213 is configured to acquire from the content provision server 400 information (path) which indicates a storing position of the selected content data 221 when the content data 221 to be played back in the content data list screen is selected by the user. Moreover, the playback-control-information generation unit 213 is configured to store the path acquired from the content provision server 400 into the setting table 215 and generate playback control information 332A. The details of the playback control information 332A will be described later.

The content provision server 400 may be implemented by a general-purpose computer including at least a CPU and a storage part.

As shown in FIG. 12, the content provision server 400 includes a predetermined storage area 410 provided in the storage part and the content data 221 is stored in the predetermined storage area 410.

Moreover, the content provision server includes a list provision unit 421 and a content provision unit 422. The list provision unit 421 is configured to supply a list of the content data 221 stored in the storage area 410 to the information terminal 200A when a content data list acquisition request associated with the content data 221 is received from the information terminal 200A.

The content provision unit 422 is configured to supply the content data 221, which is selected by the user from the content data list supplied by the list provision unit 421, to the display device 300 as the playback content data 331.

Next, the playback control information 332A according to the second embodiment is explained. FIG. 13 is a diagram showing an example of the playback control information 332A according to the second embodiment.

As shown in FIG. 13, in the playback control information 332A, a path of each of the items of the content data 221 included in the playback content data 331 is the information which indicates a storing position of the corresponding content data item in the content provision server 400.

Figure 14:
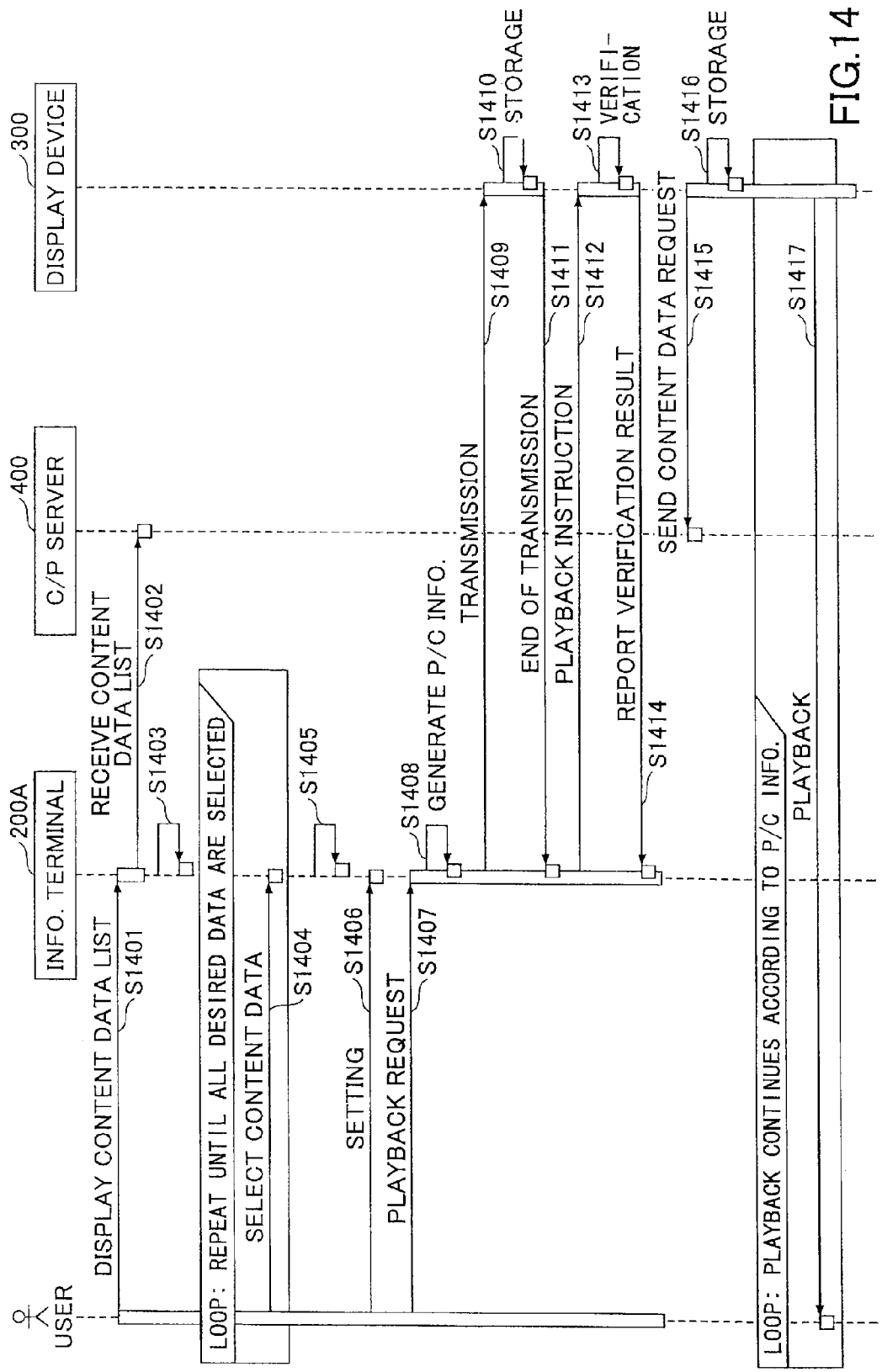
FIG. 14 is a sequence diagram for explaining operation of the display system according to the second embodiment.

Next, operation of the display system 100A according to the second embodiment is explained. FIG. 14 is a sequence diagram for explaining operation of the display system 100A according to the second embodiment.

In the display system 100A, if a user inputs a content data list display instruction associated with the content data 221 to the information terminal 200A (step S1401), the information terminal 200A causes the list acquisition unit 216 to send a content data list acquisition request associated to the content data 221 to the content provision server 400 and acquire a list of the content data 221 from the content provision server 400 (step S1402).

Here, the processing of steps S1403 to S1410 in the sequence diagram of FIG. 14 is essentially the same as the processing of steps S802 to S809 in the sequence diagram of FIG. 8, and a description thereof will be omitted.

After the playback control information 332A is stored in the storage area 330 in step S1410, the display device 300 causes the notification unit 313 to report to the information terminal 200A that transmission of the playback control information 332A is finished (step S1411).

Here, the processing of steps S1412 to S1414 of FIG. 14 is essentially the same as the processing of steps S813 to S815 of FIG. 8, and a description thereof will be omitted.

After a verification result is reported to the information terminal 200A in step S1414, the display device 300 causes the storage control unit 311 to send a content data acquisition request associated with the playback content data 331 to the content provision server 400 and acquire the playback content data 331 from the content provision server 400 (step S1415).

Subsequently, the display device 300 causes the storage control unit 311 to store the acquired playback content data 331 in the storage area 330 (step S1416).

Subsequently, the display device 300 causes the display control unit 320 to play back the playback content data 331 according to the playback control information 332A (step S1417).

As described above, in the display system 100A according to the second embodiment, even when the content data 221 is stored in an external device apart from the information terminal 200A, the playback content data 331 selected by the user may be played back on the display device 300 in conformity with the user's preference.

In the foregoing embodiments, the display device 300 acquires the playback content data 331. However, the present disclosure is not limited to these embodiments. For example, the display device 300 may be configured to include a web browser and perform the playback of the content data based on the playback control information 332A by accessing the playback content data 331 on the content provision server 400.

Moreover, in the foregoing embodiments, the information terminal 200 or 200A transmits the playback control information 332 or 332A to the display device 300. However, the present disclosure is not limited to these embodiments. For example, the information terminal 200 or 200A may upload the playback control information 332 or 332A to a server in the network and transmit to the display device 300 information indicating an upload destination to which the playback control information 332 or 332A is to be uploaded. For example, the information indicating the upload destination may be a URL (universal resource locator). In this case, the display device 300 may be configured to download the playback control information 332 or 332A based on the information indicating the upload destination. Moreover, the display device 300 may be configured to play back the playback content data 331 by accessing the playback control information 332 or 332A stored in the server based on the information indicating the upload destination.

As described in the foregoing, in the display system according to the present invention, playback control information associated with playback of content data may be set to the display device.

The display system according to the present invention is not limited to the above-described embodiments, and variations and modifications may be made without departing from the scope of the present invention.

The present application is based upon and claims the benefit of priority of Japanese Patent Application No. 2013-153230, filed on Jul. 24, 2013, the contents of which are incorporated herein by reference in their entirety.

What is claimed is:

1. A display system, comprising:
a display device; and
an information terminal for communicating with the display device, wherein
the information terminal includes first processing circuitry configured to
receive input from a user indicating a playback request, selection of playback content data, and corresponding values of setting items;
substitute the values of the setting items input by the user into a predetermined format to generate playback control information that includes, in addition to the setting items input by the user, information indicating a storing position of the selected playback content data selected from content data stored in a memory, the setting items being used to control how the selected playback content data is played back; and
transmit the selected playback content data and the generated playback control information to the display device, and
the display device includes second processing circuitry configured to
receive the selected playback content data, the playback control information, and a playback instruction from the information terminal and determine whether the playback content data is capable of being played back according to the playback control information, by determining whether the information indicating the storing position of the content data is included in the received playback control information; and
play back the playback content data using the values of the setting items in the received playback control information when determining that the information indicating the storing position of the content data is included in the received playback control information.

2. The display system of claim 1, wherein the information indicating the storage position of the selected playback content, which is generated by the first processing circuitry, is a pathname.

3. The display system of claim 1, wherein the processing circuitry is configured to transmit all of the playback control information to the display device before transmitting the playback content and the playback instruction to the display device.

4. A display device for communicating with an information terminal and for playing back playback content data, comprising:
a receiver configured to receive playback control information generated by the information terminal to control playback of the playback content data selected by a user, the playback control information including values of corresponding setting items input by the user and information indicating a storing position of the playback content data and being generated by substituting the values of the setting items input by the user into a predetermined format, the setting items being used to control how the selected playback content data is played back; and
processing circuitry configured to
receive the playback content data, the playback control information, and a playback instruction from the information terminal,
determine whether the playback content data is capable of being played back according to the playback control information, by determining whether the information indicating the storing position of the playback content data is included in the received playback control information, and
play back the playback content data using the values of the setting items in the received playback control information when determining that the information indicating the storing position of the content data is included in the received playback control information.

5. A non-transitory computer readable recording medium storing instructions for controlling playback of content data in a display system including a display device and an information terminal, wherein processing the instructions by one or more processors of the display system causes:
receiving input from a user indicating a playback request, selection of playback content data, and corresponding values of setting items;
generating playback control information on the information terminal by substituting the values of the setting items input by the user into a predetermined format, the playback control information controlling playback of the selected playback content data, which is selected from content data stored in a memory, the playback control information including values of the corresponding setting items input by the user and information indicating a storing position of the playback content data, the setting items being used to control how the selected playback content data is played back; and
transmitting the playback content data and the playback control information from the information terminal to the display device,
wherein the processing of the instructions causes:
receiving the selected playback content data, the playback control information, and a playback instruction from the information terminal;
determining whether the playback content data is capable of being played back according to the playback control information by determining whether the information indicating the storing position of the playback content data is included in the received playback control information; and playing back the playback content data using the values of the setting items in the received playback control information when determining that the information indicating the storing position of the content data is included in the received playback control information.

6. The non-transitory computer readable recording medium according to claim 5, wherein the processing of the instructions causes:

playing back the playback content data on the display device according to the playback control information, wherein the processing of the instructions further causes the playing back of the playback content data using the values of the setting items in the playback control information received from the information terminal, upon reception of the playback instruction from the information terminal.

7. The non-transitory computer readable recording medium according to claim 5, wherein the processing of the instructions causes:

displaying a setting screen for inputting values of setting items included in the playback control information on the information terminal; and associating the input values of the setting items in the setting screen with setting items of a setting table on the information terminal.

8. The non-transitory computer readable recording medium according to claim 5, wherein the playback control information comprises:

a first setting item indicating a sequence of playback of items of the playback content data;

a second setting item indicating a playback time of the playback content data; and a third setting item indicating a method of switching between display indications of the playback content data.

9. The non-transitory computer readable recording medium according to claim 5, wherein the processing of the instructions causes:

displaying a content data list screen associated with the content data stored in the memory on the information terminal, wherein the generating includes generating the playback control information for playing back the playback content data, selected from the content data list screen, on the display device.

10. The non-transitory computer readable recording medium according to claim 5, wherein the memory is provided in an external device apart from the information terminal, and the processing of the instructions causes:

acquiring, from the external device, a content data list associated with the content data stored in the memory.

* * * * *